United States Patent Office 3,787,577
Patented Jan. 22, 1974

---

3,787,577
METHOD OF TREATING DEPRESSION WITH CERTAIN DIAZEPINOINDOLES AND ANTI-DEPRESSANT COMPOSITIONS THEREOF
Joseph Francis Gardocki, Doylestown, Pa., assignor to McNeil Laboratories, Inc.
No Drawing. Filed Sept. 30, 1971, Ser. No. 185,361
Int. Cl. A61k 27/00
U.S. Cl. 424—274    12 Claims

ABSTRACT OF THE DISCLOSURE

The anti-depressant activity of 2,3,4,5-tetrahydro-1H-1,4-diazepino[1,2-a]indoles, including those substituted in the 9-position with halo or lower alkoxy, and in the 11-position with lower alkyl.

---

The invention relates to the use of certain 2,3,4,5-tetrahydro-1H-1,4-diazepino[1,2-a]indoles as antidepressant agents and to pharmaceutical compositions thereof, preferably in dosage unit form. The particular diazepinoindoles so utilized may be represented by the following structural formula:

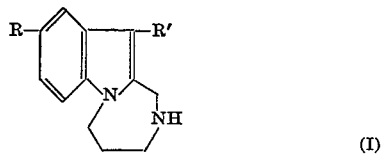

(I)

in base form or in the form of a therapeutically active acid-addition salt, wherein R is a member selected from the group consisting of hydrogen, halo, preferably chloro, and lower alkoxy, preferably methoxy; and R' is a member selected from the group consisting of hydrogen and lower alkyl, preferably methyl. Typical acid-addition salts are those formed by reacting the base (I) with an equivalent of a pharmacologically-acceptable acid such as, for example, hydrochloric, hydrobromic, sulfuric, nitric, phosphoric, fumaric, benzoic, acetic, lactic, hexamic, benzene sulfonic and the like acids.

As used herein, the terms "lower alkyl" and "lower alkoxy" contain from 1 to about 6 carbon atoms and may be straight or branched chained; and the term "halo" denotes chloro, fluoro and bromo.

The subject diazepinoindoles (I) and their process of preparation are described in Chemical Abstracts, 72, 55528v (1970), which refers to Ger. Offen. 1,928,726.

It has now been found that the subject diazepinoindoles possess marked anti-depressant activity which appears to be mediated through an effect on the central nervous system (CNS) similar to two well-known clinically effective anti-depressants, imipramine and iprindole, and are therefore useful in the treatment of depression when administered to depressed subjects. The anti-depressant activity of these compounds has been observed in experimental animals, as demonstrated in two tests generally accepted in the study of anti-depressant activity of compounds in mice:

Test I: Clinically effective anti-depressants are known to antagonize the effects of reserpine and reserpine-like compounds (i.e., tetrabenazine) in laboratory animals. Imipramine has been reported to effect a rise in body temperature when administered to hypothermic reserpinized mice. The reversal of reserpin hypothermia in mice has been proposed as a method for the screening of anti-depressant activity (Askew, B. M., Life Sci., 10, 725, 1963).

Test II: The antagonism of the decrease in exploratory activity and ptosis, induced by tetrabenazine in mice, has been employed as an experimental model of depression for the study of the anti-depressant activity of imipramine and amitriptyline [Vernier, V. G., Hanson, M. H., and Stone, C. A., 1962, in Psychosomatic Medicine, eds. J. H. Nodine and J. H. Moyer (Lea and Febiger, Philadelphia) p. 683].

The subject diazepinoindoles, when studied with respect to their effect on reserpine hypothermia in mice and on the decrease in exploratory activity and ptosis induced with tetrabenazine in mice, shows positive anti-depressant activity. In the following test procedures, the anti-depressant activity of four compounds of Formula I is demonstrated, it being understood that such compounds are not set forth for purposes of limiting the invention thereto, but only to exemplify the useful anti-depressant properties of all the compounds within the scope of Formula I, including the pharmaceutically acceptable acid-addition salts thereof.

The reserpine hypothermia assay is conducted according to the method of Askew (cited above) with the following modifications: (a) the dose of reserpine employed is 5 mg./kg. rather than 2 mg./kg.; (b) the esophogeal temperature is taken rather than the rectal temperature. Thus, the modified procedure is as follows: mice are injected with 5 mg./kg. s.c. of reserpine 17–18 hours prior to the initiation of the injection of the test compound. Immediatey prior to the intraperitoneal injection of the test compound, the esophogeal temperature is recorded, for example, by using a thermocouple and an electric universal thermometer type TE3. The esophogeal temperature is again recorded at one, two and three hours following the injection of the test compound. A group of 10 male albino mice of the Swiss Webster strain, weighing from 18–24 grams, are used per dosage level of the test compound. A group of 10 reserpinized mice, injected with 10 ml./kg. of saline serve as controls. Two clinically effective anti-depressants, imipramine and iprindole, serve as reference standards. The room temperature is 23±1° C. The statistical significance of the difference between the mean body temperature at zero time and at one, two and three hours respectively, is determined using the Students "t" Test. A value of P<0.05 is taken as significant.

The data presented in Table I, comparing four of the subject diazepinoindoles with the reference standards, show that the subject diazepinoindoles significantly elevate the body temperature in hypothermic reserpinized mice as do the reference anti-depressants, imipramine and iprindole.

TABLE I.—EFFECT OF DIAZEPINOINDOLES, IMIPRAMINE AND IPRINDOLE IN RESERPINE HYPOTHERMIA IN MICE

| Compound | Dose,[1] i.p. | Body temperature, °C.[2] | | | |
|---|---|---|---|---|---|
| | | 0 hour | 1 hour | 2 hours | 3 hours |
| A | 40 mg./kg | 27.5±1.8 | 30.9±2.5S | 32.7±1.4S | 32.0±1.0S |
| Saline | 10 ml./kg | 27.6±1.2 | 26.9±1.4 | 26.9±1.9 | 26.7±1.3 |
| B | 40 mg./kg | 28.1±1.3 | 31.9±2.0S | 33.1±1.3S | 32.1±1.9S |
| Saline | 10 ml./kg | 30.3±1.7 | 30.0±2.1 | 29.6±1.5 | 29.7±1.7 |
| C | 60 mg./kg | 28.2±1.3 | 30.6±1.8S | 31.5±1.0S | 30.6±0.5S |
| Saline | 10 ml./kg | 28.5±1.5 | 27.2±1.7 | 28.4±1.7 | 29.0±1.1 |
| D | 80 mg./kg | 27.8±0.6 | 29.5±1.0S | 29.4±1.6S | 28.5±1.5S |
| Saline | 10 ml./kg | 27.3±2.0 | 26.2±1.5 | 25.8±.9 | 25.5±0.6 |
| Imipramine HCl | 26.4 mg. kg | 29.3±1.5 | 32.5±1.9S | 34.0±1.0S | 33.2±1.4S |
| Saline | 10 ml./kg | 28.8±1.1 | 27.4±.7 | 27.8±.5 | 26.7±.8 |
| Iprindole HCl | 60 mg./kg | 26.6±1.2 | 33.2±1.1S | 33.1±1.7S | 30.7±1.8S |
| Saline | 10 ml./kg | 28.4±1.4 | 28.7±1.3 | 28.0±1.5 | 27.4±1.0 |

[1] Dose expressed in terms of the base form of the compound.
[2] Esophogeal temperature.
NOTE:
Compound A = 2,3,4,5-tetrahydro-1H-1,4-diazepino[1,2-a]indole HCl.
Compound B = 2,3,4,5-tetrahydro-9-methoxy-1H-1,4-diazepino[1,2-a]indole HCl.
Compound C = 9-chloro-2,3,4,5-tetrahydro-1H-1,4-diazepino[1,2-a]indole HCl.
Compound D = 9-chloro-2,3,4,5-tetrahydro-11-methyl-1H-1,4-diazepino[1,2-a]indole HCl.
S = $P < 0.05$.

The effect of the subject diazepinoindoles on the decrease in exploratory activity and ptosis induced with tetrabenazine in mice is demonstrated by the method of Vernier, V.G., et al. (cited above). The mice employed are similar in body weight, sex and strain, as the mice described used in the reserpin hypothermia assay.

Mice are injected with the test compound 30 minutes prior to the injection of 32 mg./kg. i.p. of tetrabenazine. Thirty minutes post tetrabenazine, the mice are tested for the presence of normal exploratory activity and ptosis. A group of 10 mice injected with 32 mg./kg. i.p. serve as controls. Three to five dosage levels, 10 mice per dosage level, are used per compound. The dose of the test compound that would be expected to antagonize (i.e., to revert to normal as compared to untreated mice) the aforementioned effects of tetrabenazine in 50% of mice so tested, $ED_{50}$ and 95% confidence limits, are calculated according to the method of Litchfield, J. T. and Wilcoxon, F. (J. Pharmacol. Exptl. Therap. 96, 99, 1949). When the response to tetrabenazine in the control group is 90% or less, a correction is made for "natural mortality" using Abbott's formula (Finney, D. J., 1964, Probit Analysis, second edition, University Press, Cambridge, p. 88).

As shown in Table II, the diazepinoindole compounds, as well as imipramine and iprindole, are effective in reversing the decrease in exploratory activity and ptosis induced with tetrabenazine in mice.

TABLE II.—EFFECT OF DIAZEPINOINDOLES, IMIPRAMINE AND IPRINDOLE ON TETRABENAZINE-INDUCED LOSS OF EXPLORATORY ACTIVITY AND PTOSIS IN MICE

| Compound:[1] | No. of dosage levels[2] | Exploratory activity, $ED_{50}$ (95% confidence limits)[3] | Ptosis, $ED_{50}$ (95% confidence limits)[3] |
|---|---|---|---|
| A | [4] 3 | 7.6 (4.8–11.9) mg./kg. i.p. | 5.8 (2.4–13.9) mg./kg. i.p. |
| B | [5] 5 | 8.6 (6.4–11.5) mg./kg. i.p. | 11.3 (8.2–15.6) mg./kg. i.p. |
| C | [6] 5 | 30.0 (18–51.0) mg./kg. i.p. | 38.0 (28–52.0) mg./kg. i.p. |
| D | [7] 5 | 80.0 (41–152) mg./kg. i.p. | 110.0 (75–161) mg./kg. i.p. |
| Imipramine HCl | | 1.1 (.71–1.8) mg./kg. i.p. | .77 (.60–1.0) mg./kg. i.p. |
| Iprindole HCl | | 130 (72–234) mg./kg. i.p. | 66.0 (53–82) mg./kg. i.p. |

[1] For identity of Compound, see Table I.
[2] 10 mice used per dosage level.
[3] Dose expressed in terms of the base form of the compound.
[4] 1.0, 10.0 and 30.0 mg./kg. i.p.
[5] 1.0, 5.0, 8.0, 10.0 and 30.0 mg./kg. i.p.
[6] 1.0, 10.0, 30.0, 60.0 and 80.0 mg./kg. i.p.
[7] 10.0, 20.0, 40.0, 60.0 and 80.0 mg./kg. i.p.

In addition to the two foregoing tests, the behavioral profile observed with the subject diazepinoindoles, tested at doses of 3, 10, 30, 100 and 300 mg./kg. i.p., in groups of 3 mice each, in a standard mouse behavior assay, indicates that the subject compounds do not produce overt stimulation in mice as does, for example, amphetamine. The behavioral profile one observes with imipramine and iprindole under similar test conidtions also does not indicate overt stimulant activity as is seen with amphetamine.

From the foregoing, it is evident that the subject diazepinoindoles possess anti-depressant activity similar to that of imipramine and iprindole as shown by their effect on reserpine hypothermia and on the decrease in exploratory activity and ptosis induced with tetrabenazine in mice. The absence of overt stimulant activity in mice is a further indication of the similarity of these diazepinoindoles to that of imipramine and iprindole.

The anti-depressant activity observed with the subject diazepinoindoles is an unexpected and surprising effect in view of the fact that the previously reported pharmacological properties of said diazepinoindoles (see previously cited literature reference) related to pulmonary vasodilation which would not suggest anti-depressant activity.

To prepare the pharmaceutical compositions of this invention, a diazepinoindole of Formula I, in base or acid-addition salt form, as the active ingredient is combined in intimate admixture with a pharmaceutically acceptable carrier, which carrier may take a wide variety of forms depending on the form of preparation desired for administration. For example, in preparing the compositions in oral dosage form, any of the usual pharmaceutical media may be employed, such as, for example, water, glycols, oils, alcohols and the like in the case of oral liquid preparations such as suspensions, elixirs and solutions; or solid carriers such as starches, sugars, kaolin, lubricants, binders, distintegrating agents and the like in the case of powders, capsules and tablets. Because of their ease in administration, tablets and capsules represent the most advantageous oral dosage form, in which case solid pharmaceutical carriers are obviously employed. For parenteral compositions, the carrier will usually comprise sterile water, at least in large part, though other ingredients, for example, to aid solubility, may be included. Injectable solutions, for example, may be prepared in which the carrier comprises saline solution, glucose solution or a mixture of saline and glucose solution. Injectable suspensions may also be prepared in which case appropriate liquid carriers, suspending agents and the like may be employed.

It is especially advantageous to formulate the aforementioned pharmaceutical compositions in dosage unit form for ease of administration and uniformity of dosage. Dosage unit form as used in the specification and claims herein refers to physically discrete units suitable as unitary dosages, each unit containing a predetermined quantity of active ingredient calculated to produce the desired therapeutic effect in association with the required pharmaceutical carrier. Examples of such dosage unit forms are tablets, capsules, pills, powder packets, wafers, injections, teaspoonfuls, tablespoonfuls and the like, and segregated multiples thereof. The amount of active ingredient per dosage unit will be from about 5 mg. to about 250 mg., and, preferably, from about 25 mg. to about 150 mg.

The following formulations exemplify typical oral and parenteral anti-depressant pharmaceutical compositions in dosage unit form suitable for administration to depressed subjects in accordance with the instant invention.

Capsules: 10,000 hard gelatin capsules, each containing as the active ingredient (A.I.) 25 milligram of 2,3,4,5-tetrahydro-1H-1,4-diazepino[1,2 - a]indole hydrochloride are prepared from the following formulation:

| | Grams |
|---|---|
| A.I. | 250 |
| Lactose | 750 |
| Starch | 250 |
| Talc | 250 |
| Calcium stearate | 10 |

A uniform mixture of the active and supplementary ingredients is prepared and filled into two-piece hard gelatin capsules.

Tablets: 5,000 compressed tablets, each containing as the active ingredient 10 milligrams of 2,3,4,5-tetrahydro-9-methoxy-1H-1,4-diazepino[1,2 - a]indole hydrochloride are prepared from the following formulation:

| | Grams |
|---|---|
| A.I. | 50 |
| Starch | 75 |
| Dibasic calcium phosphate hydrous | 500 |
| Calcium stearate | 2.5 |

The finely powdered ingredients are mixed well and granulated with 10% starch paste. The granulation is dried and compressed into tablets using starch as a disintegrant and calcium stearate as a lubricant.

Oral suspension: The following formulation provides 5 liters of an oral suspension comprising 25 mg. of 9-chloro-2,3,4,5-tetrahydro-1H-1,4-diazepino[1,2-a]indole as the active ingredient per teaspoonful (5 mils.):

| | Grams |
|---|---|
| A.I. | 25.0 |
| Sucrose | 300.0 |
| Dioctyl sodium sulfosuccinate | 0.5 |
| Bentonite | 22.5 |
| Methyl paraben | 7.5 |
| Propyl paraben | 1.5 |
| Antifoam A.F. emulsion | 0.15 |
| Propylene glycol | 52.0 |
| FD&C Yellow #5 | 0.1 |
| Sodium cyclamate | 50.0 |
| Sodium saccharin | 5.0 |
| Orange flavor | 7.5 |
| Filtered purified water, p.s., ad. 5 liters. | |

Dissolve the parabens in the propylene glycol and add this solution to a solution of the sodium cyclamate, sodium saccharin and sucrose in half the water. Suspend the bentonite in hot (about 85° C.) water and stir for 60 minutes. Add the bentonite solution to the former solution.

Dissolve the sulfosuccinate in some water and suspend the A.I. in the resulting solution. Add the Antifoam A.F. Emulsion which has been diluted to a lotion consistency with a minimum amount of water and mix well. Add the latter suspension of A.I. to the former mixture and mix well. Add the FD&C Yellow #5 dissolved in a small amount of water. Add the orange flavor, q.s. to volume with water, and stir to a homogeneous mixture. Pass the mixture through a colloid mill and fill into suitable containers.

Injectable: The following formulation provides 1 liter of a parenteral suspension comprising 5 mg. of 9-chloro-2,3,4,5 - tetrahydro - 11 - methyl - 1H - 1,4-diazepino[1,2-a]indole as the active ingredient per milliliter:

| | Grams |
|---|---|
| A.I. | 5.0 |
| Polysorbate 80 | 2.0 |
| Sodium chloride | 9.0 |
| Sodium carboxymethyl cellulose | 10.0 |
| Methyl paraben | 1.8 |
| Propyl paraben | 0.2 |
| Water for injection, U.S.P., q.s. ad. 1 liter. | |

Dissolve the parabens, sodium chloride and carboxymethyl cellulose in ½ the total volume of water by heating to 95° C. to obtain a clear solution. Filter and autoclave. Dissolve the polysorbate in ⅓ the total volume of water. Filter and autoclave this second solution. Add sterile A.I. to the second solution and pass through a sterile colloid mill. To the resulting suspension, add the first solution with uniform stirring. Q.s. with water and stir while filling into sterile vials.

The process of this invention comprises internally administering to depressed subjects an effective anti-depressant amount of diazepinoindole of Formula I or a therapeutically active acid-addition salt thereof intimately admixed with a pharmaceutically acceptable carrier. Preferably, the dosage per kilo of body weight of the subject treated would vary from about 1 mg. to about 80 mg. of the active anti-depressant ingredient. The process also embraces the administration of the hereinabove described dosage unit forms to such subjects for anti-depressant purposes. The preferred diazepinoindole is 2,3,4,5-tetrahydro - 1H - 1,4 - diazepino[1,2-a]indole and the therapeutically active acid-addition salts thereof, most preferably, the hydrochloride.

What is claimed is:

1. The method of inhibiting depression which comprises internally administering to a depressed subject a pharmaceutical composition comprising an effective anti-depressant amount of a member selected from the group consisting of a diazepinoindole having the formula:

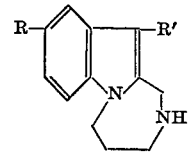

and the therapeutically active acid-addition salts thereof, wherein R is a member selected from the group consisting of hydrogen, halo and lower alkoxy, said halo being a member selected from the group consisting of chloro, fluoro and bromo, and R' is a member selected from the group consisting of hydrogen and lower alkyl, as an active ingredient in admixture with a pharmaceutical carrier.

2. The method of claim 1 wherein said active ingredient is 2,3,4,5 - tetrahydro - 1H - 1,4-diazepino[1,2-a]indole hydrochloride.

3. The method of claim 1 wherein said active ingredient is 2,3,4,5 - tetrahydro - 9 - methoxy - 1H-1,4-diazepino[1,2-a]indole hydrochloride.

4. The method of claim 1 wherein said active ingredient is 9 - chloro - 2,3,4 - tetrahydro - 1H-1,4-diazepino[1,2-a]indole hydrochloride.

5. The method of claim 1 wherein said active ingredient is 9 - chloro - 2,3,4,5 - tetrahydro-11-methyl-1H-1,4-diazepino[1,2-a]indole hydrochloride.

6. An anti-depressant pharmaceutical composition in dosage unit from about 5 to about 250 mg. of a member selected from the group consisting of a diazepinoindole having the formula:

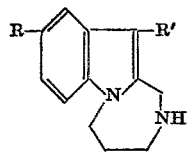

and the therapeutically active acid-addition salts thereof, wherein R is a member selected from the group consisting of hydrogen, halo and lower alkoxy, said halo being a member selected from the group consisting of chloro, fluoro and bromo, and R' is a member selected from the group consisting of hydrogen and lower alkyl, as an active ingredient in admixture with a solid pharmaceutical carrier suitable for oral administration.

7. Claim 6 wherein said active ingredient is 2,3,4,5-tetrahydro - 1H - 1,4 - diazepino[1,2-a]indole hydrochloride.

8. Claim 6 wherein said active ingredient is 2,3,4,5-tetrahydro - 9 - methoxy - 1H - 1,4-diazepino[1,2-a]indole hydrochloride.

9. Claim 6 wherein said active ingredient is 9-chloro-2,3,4,5 - tetrahydro - 1H - 1,4 - diazepino[1,2-a]indole hydrochloride.

10. Claim 6 wherein said active ingredient is 9-chloro-2,3,4,5 - tetrahydro - 11 - methyl - 1H-1,4-diazepino[1,2-a]indole hydrochloride.

11. Claim 6 wherein said dosage unit is a tablet.

12. Claim 6 wherein said dosage unit is a capsule.

References Cited

R. Chem. Abst. vol. 72 55528V (1970).

STANLEY J. FRIEDMAN, Primary Examiner

PO-1050
(5/69)

UNITED STATES PATENT OFFICE
CERTIFICATE OF CORRECTION

Patent No. 3,787,577　　　　　　　　Dated　January 22, 1974

Inventor(s)　Joseph Francis Gardocki

It is certified that error appears in the above-identified patent and that said Letters Patent are hereby corrected as shown below:

In Column 6, Claim 6, Line 75, after dosage unit, the phrase "form comprising per dosage unit", has been omitted.

Signed and sealed this 10th day of September 1974.

(SEAL)
Attest:

McCOY M. GIBSON, JR.　　　　　　　　　　　C. MARSHALL DANN
Attesting Officer　　　　　　　　　　　　Commissioner of Patents